United States Patent [19]

Rudolph et al.

[11] Patent Number: 4,976,397
[45] Date of Patent: Dec. 11, 1990

[54] ANTI-ICING SYSTEM FOR AIRCRAFT

[75] Inventors: Peter K. C. Rudolph, Seattle, Wash.; Douglas L. Bader, Phoenix, Ariz.

[73] Assignee: The Boeing Company, Seattle, Wash.

[21] Appl. No.: 186,952

[22] Filed: Apr. 27, 1988

Related U.S. Application Data

[63] Continuation-in-part of Ser. No. 687,586, Dec. 31, 1984, Pat. No. 4,741,499.

[51] Int. Cl.⁵ .............................................. B64D 15/04
[52] U.S. Cl. ................................................. 244/134 B
[58] Field of Search ...................... 244/134; 60/39.093

[56] References Cited

U.S. PATENT DOCUMENTS

| | | | |
|---|---|---|---|
| 1,750,777 | 3/1930 | Ingram | 244/134 D |
| 1,864,438 | 6/1932 | Janson | 244/134 B |
| 2,766,740 | 8/1956 | Brass | 244/134 B |
| 3,917,193 | 11/1975 | Runnels, Jr. | 244/134 B |

FOREIGN PATENT DOCUMENTS

| | | | |
|---|---|---|---|
| 57403 | 1/1953 | France | 244/134 B |
| 330266 | 10/1935 | Italy | 244/134 R |
| 536344 | 5/1941 | United Kingdom | 244/134 B |
| 557905 | 12/1943 | United Kingdom | 244/134 B |

Primary Examiner—Galen Barefoot
Attorney, Agent, or Firm—Hughes & Multer

[57] ABSTRACT

A deicing system for leading edges of an aircraft. There is a hot air supply tube extending along the leading edge, a fan to move air through the tube, compressor to heat the air that is moved through the tube, and pressure release valves. The hot air is discharged from openings in the tube to spray against the internal surfaces of the wall forming the leading edge.

32 Claims, 6 Drawing Sheets

ANTI-ICING SYSTEM FOR AIRCRAFT

CROSS REFERENCE TO RELATED APPLICATIONS

This is a continuation-in-part of U.S. patent application Ser. No. 06/687,586, filed Dec. 31, 1984, now U.S. Pat. No. 4,741,499.

BACKGROUND OF THE INVENTION

1. Field of the Invention

The present invention relates to an anti-icing system for an aircraft.

2. Background Art

The anti-icing system most widely used for airfoil leading edges and engine inlets on commercial airplanes utilizes engine compressor bleed air. The system is an on/off type system that is sized by a low power setting idle descent icing condition. The system is oversized for most other conditions and is therefore wasteful. Also, a great portion of the energy bled from the engine is wasted before it reaches its destination. There are bleed port pressure losses, duct pressure losses, temperature reduction due to the pre-cooler under certain conditions, temperature losses in the ducting and the temperature and pressure loss in the spray hole nozzles. Commonly, after the warm air performs its deicing or anti-icing function against the wing leading edge, this air is dumped overboard, and this is a major energy loss.

Another disadvantage of the prior art system is that bleed air extraction from the engine causes thrust loss and an increase in specific fuel consumption. With high by-pass engines becoming more efficient, the engine gas generators becomes even smaller so that the bleed air penalties are larger yet. For these and other reasons, various alternative anti-icing systems have been investigated.

One consideration is to use a spray system where a substance such as glycol is sprayed onto the wing surface. However, this has certain drawbacks and then it would require use of a large amount of the deicing material. Also there is the problem of contamination of the wing surface.

Another prior art approach is to use inflatable rubber boots to form the leading edge of the wing. While this approach was widely used for deicing slower propeller airplanes, it generally does not provide a smooth enough surface for a high performance airplane. Also, the boot needs fairly frequent replacement due errosion and aging.

Another approach is to position electric resistance heaters, such as heater blankets, against the inside of the leading edge skin. The problem with this arrangement is the poor conductivity of the thin-air layer between the blanket and the leading edge skin. To heat the wing skin to a safe temperature, the blanket temperature has to be very high.

A search of the patent literature has disclosed a number of deicing systems. These are as follows:

U.S. Pat. No. 1,868,468, Thompson, discloses the use of electric heating elements located in the leading edges of the wings and other aerodynamic components of an airplane to alleviate the problem of these surfaces possibly becoming coated with ice. A rheostat controls the amount of current to the heating elements, and heat from these elements is applied directly to the leading edges.

U.S. Pat. No. 1,943,062, Driscoll, discloses an anti-icing system where a plurality of electrically conductive wires are positioned at spaced locations along the wing surfaces. When moisture, in the form of sleet or ice, begins to form on the wings, electric current will flow from one wire through the sleet or snow to the other wire, so as to melt the sleet, ice or snow and cause it to be removed from the wing.

U.S. Pat. No. 2,304,686, Gregg, shows a deicing system for an aircraft where a coil is placed about the exhaust stack of the aircraft engine so as to absorb heat therefrom. The heat exchange fluid in the coil is then directed through a manifold which is in proximity with the aircraft surfaces which are to be deiced. In another arrangement, there are electric heating coils mounted to the forward portion of the engine cowl. A commutator may be used to cause the flow of current or interrupt the flow of current, as needed, for deicing.

U.S. Pat. No. 2,390,093, Garrison, shows a deicing system for an aircraft where the leading edge surface of the wing is made of a porous material (i.e. porous sintered metal plates) through which anti-icing fluid is directed.

U.S. Pat. No. 2,418,205, Taylor, shows a deicing system where the leading edge of the wing is an inflatable structure which can be distorted to break up the ice which forms on the leading edge. The airfoil surfaces immediately rearwardly of the leading edge are stationary surfaces and are heated by other means. One system places heat exchange tubes adjacent the upper and lower surfaces, and a heat exchange medium is directed through these tubes to provide heat and then through return tubes, so as to form a closed loop system. Also electrically conductive heating elements are used to heat these upper and lower surfaces.

U.S. Pat. No. 2,591,757, Young, shows an airfoil where the front spar can be made in sections, and a heating element is provided at the juncture point of the two sections forming the forward part of the spar.

U.S. Pat. No. 2,869,535, Horrell, shows a deicing system where ambient air is drawn into a duct and moved by a fan through a heater, with the air passing from the heater being directed through a passageway at the leading edge of the wing.

German patent No. 709,354, shows what appear to be heating tubes disposed in the leading edge of an airfoil.

SUMMARY OF THE INVENTION

The deicing system of the present invention is adapted for use in an aircraft structure which has a surface member having an exposed surface area upon which ice tends to collect, and which defines an enclosed chamber adjacent thereto.

The system comprises a hot air distribution tube having an inlet. The tube is positioned in the chamber and has outlets to discharge hot air into the chamber so as to be in heat exchange relationship with the surface member.

There is a fan unit having an inlet to receive air from the chamber and to move the air to the inlet portion of the tube. An electric heater is arranged to heat the air which travels through the tube and is discharged in a heat exchange relationship with the surface member.

There is pressure relief valve means communicating between the chamber and an ambient air location. The valve means is arranged to discharge air from the chamber when pressure in the chamber exceeds ambient pressure by a predetermined level, and to admit ambient air into the chamber when pressure in the chamber is below ambient pressure by a predetermined level.

There is power supply and control means adapted to selectively supply power to, and cause operation of, the fan means and the heater, so as to cause heated air to be directed through the distribution tube and in heat exchange relationship with the surface member.

In a preferred embodiment, the aircraft structure comprises a leading edge structure, and the system comprises a modular system which can be inserted in, and removed from, the leading edge structure. The leading edge structure is a fixed leading edge structure. Also, in the preferred form, the surface member comprises a skin portion of the leading edge structure. The chamber comprises an elongated duct having a length-wise axis along the leading edge structure. This elongate duct serves as a return passageway to return air discharged from the tube back to the fan unit.

Preferably, the fan unit is located in an upstream direction, relative to flow of air in the system, from the heater. Thus, the air from the fan unit passes through the heater and then into the spray tube.

The preferred form of the valve means is that there is an outlet valve and an inlet valve. The outlet valve is located in the return duct where the flow velocity is low and thus static pressure is high. The inlet valve which is to admit ambient air into the inlet of the fan unit is located in the venturi section of the inlet, where the flow velocity is high and static pressure is low. The additional ambient air drawn into the system through the inlet valve mixes with the air already in the system downstream of the venturi entrance portion and passes through the fan means.

The total system of the present invention is utilized in an aircraft having a plurality of surface members, each of which has an exposed surface area upon which ice tends to collect. Each deicing unit of the system comprises the components named above, namely, the tube, fan unit, electric heater and pressure relief valve means. The control means for the total system is arranged in a manner that at least some of the deicing units can be operated sequentially, thus alleviating total power requirements for the total system. Also, the temperature sensing incorporated assures a thermal input tailored to provide the minimum energy required to do the anti-icing job. That is, at icing conditions with higher ambient temperature, the thermal input will be less, thus avoiding overkill and waste of energy.

In another embodiment of the present invention, the resistance heater is eliminated, and the fan means is provided in the form of a compressor which compresses the air sufficiently to substantially raise the temperature of the air to a deicing temperature. Then this heated compressed air is discharged through the distribution tube so as to be in heat exchange relationship with the surface member. In the preferred form, the pressure ratio of the circulating fan means approaches two to one. In this embodiment, the source of energy for anti-icing is from cooling the electric motor for the fan and from isotropic compression of air.

In a further embodiment, there is a second hot air distribution system comprising a second tube means, second fan means and a second electric heater. In the preferred form, the chamber has a lengthwise axis and the first and second tube means both extend along the lengthwise axis so that both of the first and second tube means discharge hot air into the chamber at locations along the lengthwise axis. Thus, if one of said tube means is not discharging air, the other of said tube means is able to deliver hot air at said locations. As shown herein, the first and second tube means are arranged so that airflow in the first tube means is opposite to airflow in the second tube means. A desirable application is for these to be placed in the leading edge of an engine inlet, with the first and second tube means extending circumferentially around the engine inlet.

In a further embodiment, the structure is a leading edge, having a front skin portion, a first side skin portion, and a second side skin portion. The system further comprises a rear wall means defining a rear part of the chamber and extending between the first and second side skin portions. The rear wall means is positioned so as to expose a greater portion of the first skin portion to the hot air in the chamber, and to expose a lesser portion of the second skin portion to hot air in the chamber, whereby greater deicing is accomplished at said first skin portion. In one arrangement, the leading edge structure is a leading edge portion of a wing, with the first skin portion being at an upper surface of the wing leading edge. In another embodiment, the leading edge structure is a horizontal stabilizer leading edge structure, and the first skin portion is at a lower surface of said stabilizer leading edge structure.

Other features become apparent from the following detailed description.

DESCRIPTION OF THE PREFERRED EMBODIMENT

Figure 1:
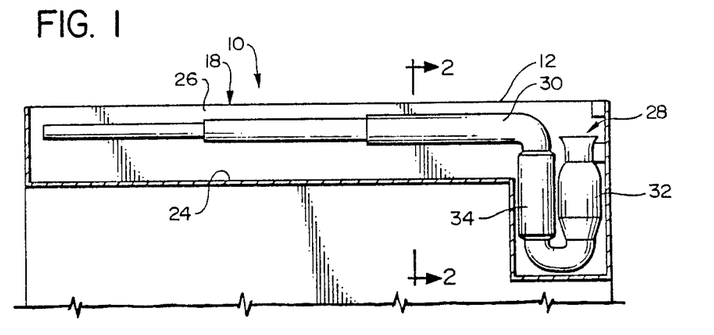
FIG. 1 is a semi-schematic top plan view of a leading edge slat of a wing, incorporating the invention, and showing the upper skin of the slat removed.
Figure 2:
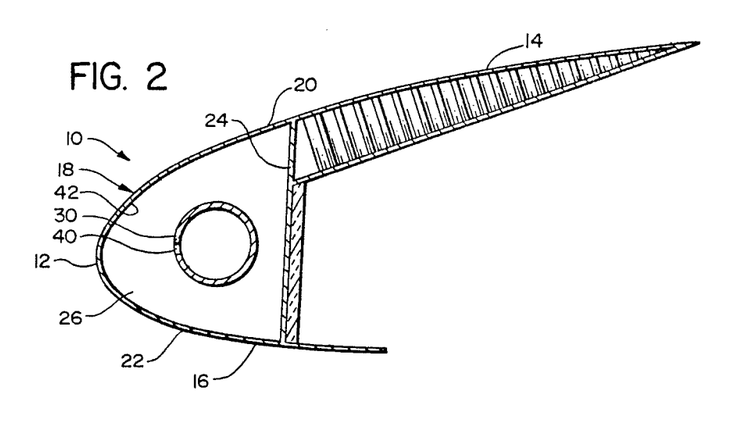
FIG. 2 is a sectional view taken along a chordwise axis of the slat along line 2—2 of FIG. 1.

In FIG. 1, there is shown a leading edge slat 10 of a wing, said slat having a leading edge 12, an upper surface 14 and a lower surface 16. The slat 10 has a nose structure 18 which is essentially a skin section that forms the leading edge 12 and forward portions 20 and 22 of the upper and lower surfaces 14 and 16, respectively. At the rear of the nose section 18, there is a structural member in the form of a web 24. The nose section 18 and the web 24 collectively define an elongate chamber or duct 26 extending along the entire length of the slat 10.

The deicing system of the present invention, generally designated 28, is shown positioned in the leading edge slat 12. This system 28 comprises a supply tube 30, a fan unit 32, a heater 34 and pressure relief valves 36 and 38.

Figure 3:
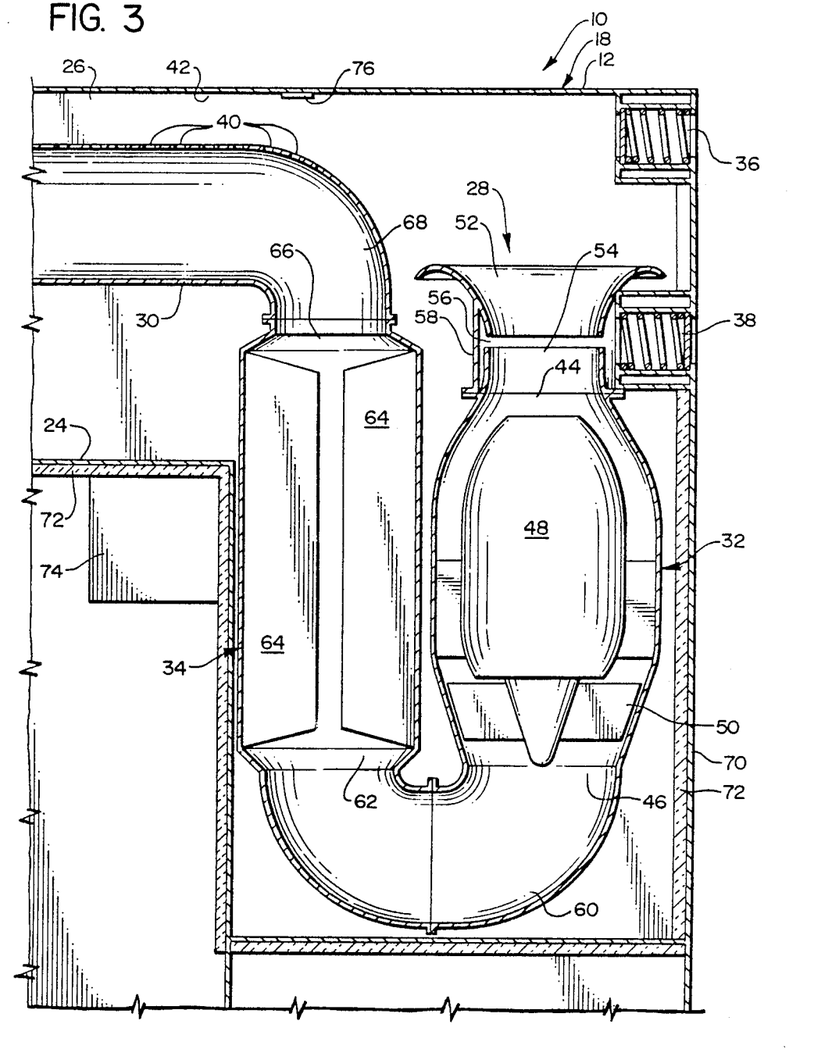
FIG. 3 is a view similar to FIG. 1, but drawn to an enlarged scale and illustrating the components of the anti-icing module in more detail.

The supply tube 30 extends substantially the entire length of the duct or chamber 26, and the tube 30 is formed along its length with a plurality of small openings 40 through which hot air is discharged to impinge upon the inner surface 42 of the skin forming the nose structure 18. The arrangement of these openings 40 is such that the distribution of the hot air provides the proper concentration of heat against the nose structure 18.

The fan unit 32 has an inlet 44, an outlet 46, an electric motor 48 and fan blades 50. The inlet 44 has a Venturi-like configuration, where there is a bell shaped entrance 52 leading into a throat 54. The throat 54 is formed with a circumferential slot 56 which opens inwardly in a downstream direction so as to draw surrounding air into and through the slot 56.

The valve 36 is an outlet valve, and the valve 38 is an inlet valve. The inlet valve 38 leads into a circumferential housing 58 that surrounds the slot 56. As will be described in more detail later herein in the description of the operation of the present invention, under circumstances where the pressure in the chamber or duct 26 is below ambient pressure, the relief valve 38 admits ambient air into the housing 58, with this air flowing from the housing 58 inwardly through the slot 56 to be circulated by the fan 32 through the system.

The outlet 46 of the fan 32 leads through a 180 degree tubular connecting section 60 into an inlet end 62 of the heater 34. The heater 34 has a plurality of electric heating elements 64 which heat the air flowing into the inlet end 62, with the heated air passing from an outlet 66 of the heater 34. The heater outlet 66 leads into an inlet end 68 of the supply tube 30.

The pressure relief valve 36 is positioned in the return duct a short distance forwardly of the valve 38, and this valve 36 opens under circumstances where the air pressure within the chamber or duct 26 is above ambient pressure by predetermined pressure difference. The fan 32, heater 34 and valves 36 and 38 are located in a spanwise direction at one end of the slat 10, with the fan unit 32 and heater 34 being positioned in a housing 70 positioned in a chordwise direction a short distance rearwardly of the web 24 of the slat 10. This housing 70 and also the back surface of the web 24 are provided with suitable insulation, as at 72.

To supply electric power to the fan motor 48 and to the heater 34, there is provided a control module, indicated somewhat schematically at 74, with this control module 74 being positioned outside of the chamber or duct 26. A thermo-couple 76 is mounted to the inside surface of the skin that forms the nose structure 18. This thermo-couple 76 is operatively connected to the control module 74 to provide the input for the control module 74 to control the current to the heater 34 and also the operation of the fan unit 32.

To describe the operation of the present invention, let it be assumed that the aircraft to which the slat 10 is mounted is travelling through an icing condition, such as during climb or decent through icing clouds. To remove ice that is formed on the nose structure 18 (or to prevent the formation of such ice), the control module 74 causes current to start the fan unit 32 operating and also power is delivered to the heater 34 to raise the temperature of the heating element 64 to a desired level. The fan unit 32 circulates the air through the heater 34 and then through the supply tube 30. The hot air in the supply tube sprays forwardly in a proper distribution pattern against the inside surface 42 of the nose structure 18, so as to heat the structure 18 and cause removal of the ice or prevention of ice formation. The air discharged from the tube 30 then flows in a spanwise direction through the chamber of duct 26 back to the inlet 44 of the fan 32.

In the event that pressure in the chamber 26 rises above ambient pressure by a certain pressure increment (either due to a temperature increase in the air or possibly a change in altitude), the pressure relief outlet valve 36 responds to permit an outflow of air from the chamber 26. On the other hand, if the pressure in the chamber 26 drops below ambient, then the inlet pressure relief valve 38 responds to permit an inflow of ambient air. As described previously, this ambient air proceeds through the circumferential slot 56 to be circulated through this system by the fan 32.

It can readily be appreciated that the deicing system 28 can be supplied as a modular unit which can readily be installed as a unit in the slat 10, and also be easily removed for replacement or repair. Further, this deicing system 28 can be totally positioned within the slat 10, with the only operative connection to other parts of the airplane being through electric wires to a power source in the airplane.

Figure 4:
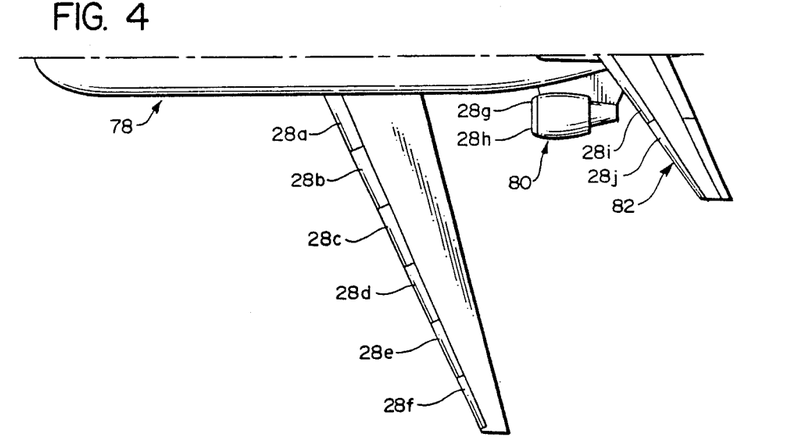
FIG. 4 is a top elevational view of an aircraft, showing only half of the aircraft on one side of the longitudinal center line, and illustrating the locations of the modular units of the present invention.

While the deicing system 28 has been shown mounted to a leading edge slat, it is to be understood that similar modular systems 28 can be installed in other areas of the aircraft. With reference to FIG. 4, there is shown an aircraft 78 having six modular system units 28 (designated 28a–28f) mounted at six locations along the leading edge of the wing, two modular deicing systems (28g and 28h) mounted to the leading edge of an engine cowl 30, and two additional deicing system units (28i and 28j) mounted to the leading edge of a horizontal stabilizer 82.

Another desirable feature of the present invention is that since the deicing system 28 can be provided in the form of a plurality of modular units, it is possible to operate these various deicing units 28a–j in a selected sequential pattern. Thus the units 28a, b, g and h may be operated continuously for anti-icing, while the remaining units 28c–f, 28i and 28j may be operated in a cyclic pattern for deicing. For example, the unit 28c might be operated for one minute to remove an accumulation of ice, and then deactivated for two minutes, while power is delivered sequentially to the units 28d and 28e. This arrangement would insure that adequate power could be supplied to any one unit 28 so that it could properly accomplish the deicing function, but would not require a total output at a level to operate all of the units 28a-j simultaneously.

Figure 5:
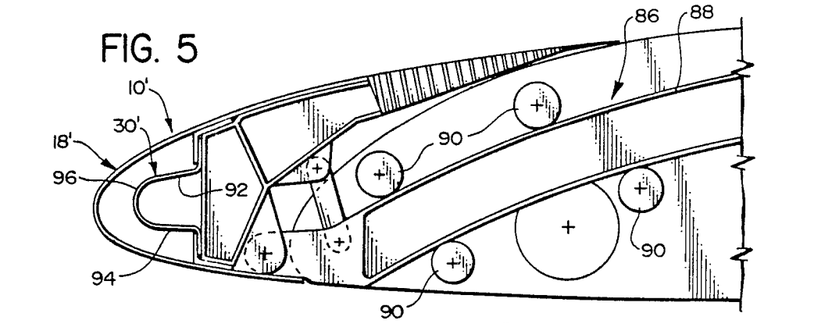
FIG. 5 shows a slightly modified version of the present invention incorporated in a leading edge slat of a wing.

With reference to FIG. 5, there is shown a somewhat modified version of the present invention. FIG. 5 shows the leading edge structure of a wing 84 more completely. There is a leading edge slat 10' having a nose structure 18'. The wing 84 has a track assembly 86 comprising a track 88 and rollers 90, with this track assembly 86 deploying the slat 10' forwardly and downwardly to its extended position.

The supply tube 30' in FIG. 5 is not formed as a cylindrical tube, but rather has a U-shaped configuration, with upper and lower generally planar wall portions 92 and 94, respectively, and a forward semi-circular wall portion 96 joining to the wall portions 92 and 94.

The operation of the modified embodiment shown in FIG. 5 is substantially the same as in the first embodiment, so no detailed description of the second embodiment will be given. This second embodiment lends itself more towards a low pressure system, while the circular supply duct of the first embodiment is more suited for a high pressure system.

Figure 6:
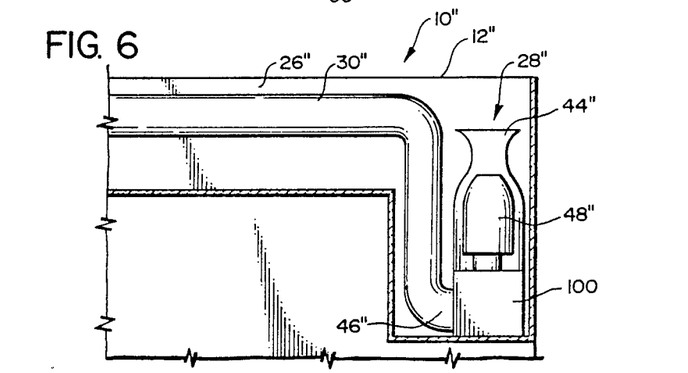
FIG. 6 is a semi-schematic top plan view of a leading edge slat of a wing incorporating a second embodiment, which is a heaterless anti-icing module with high pressure compressor.

A third embodiment of the present invention is illustrated somewhat schematically in FIG. 6. Components of this third embodiment which are similar to components of the first embodiment will be given like numerical designations, with a double prime ('') distinguishing those of the third embodiment.

Thus, there is a leading edge slat 10'' having an elongate chamber or duct 26'' and a deicing system 28''. There is a supply tube 30'', and an electric motor 48'' driving a compressor 100. There is a compressor inlet 44'' and an outlet 46'' leading to the distribution tube 30''.

This third embodiment differs from the first embodiment in that the electric heater is eliminated, and the heat supplied to the deicing air is derived from the energy imparted by the compressor 100. The compression ratio of this compressor 100 is sufficiently high (i.e. approaching two to one) so that the air in the tube 30'' is at a sufficiently high temperature (e.g. 400° F.) so that when this air is discharged against the surface of the slat 10, it is at an adequate deicing temperature (e.g. 200° F.). Since the motor 48'' is located in the path of the air being circulated, the heat from the motor is transferred to this air and is utilized as heat to accomplish the deicing.

FIGS. 7 through 10 show a fourth embodiment of the present invention where there is an aircraft 110 having a wing 112 with a fixed leading edge section 114. The anti-icing apparatus is, or may be, substantially the same as the anti-icing apparatus of the first embodiment, so this is shown only schematically in FIGS. 7 through 10.

Figures 7, 7A, 8:
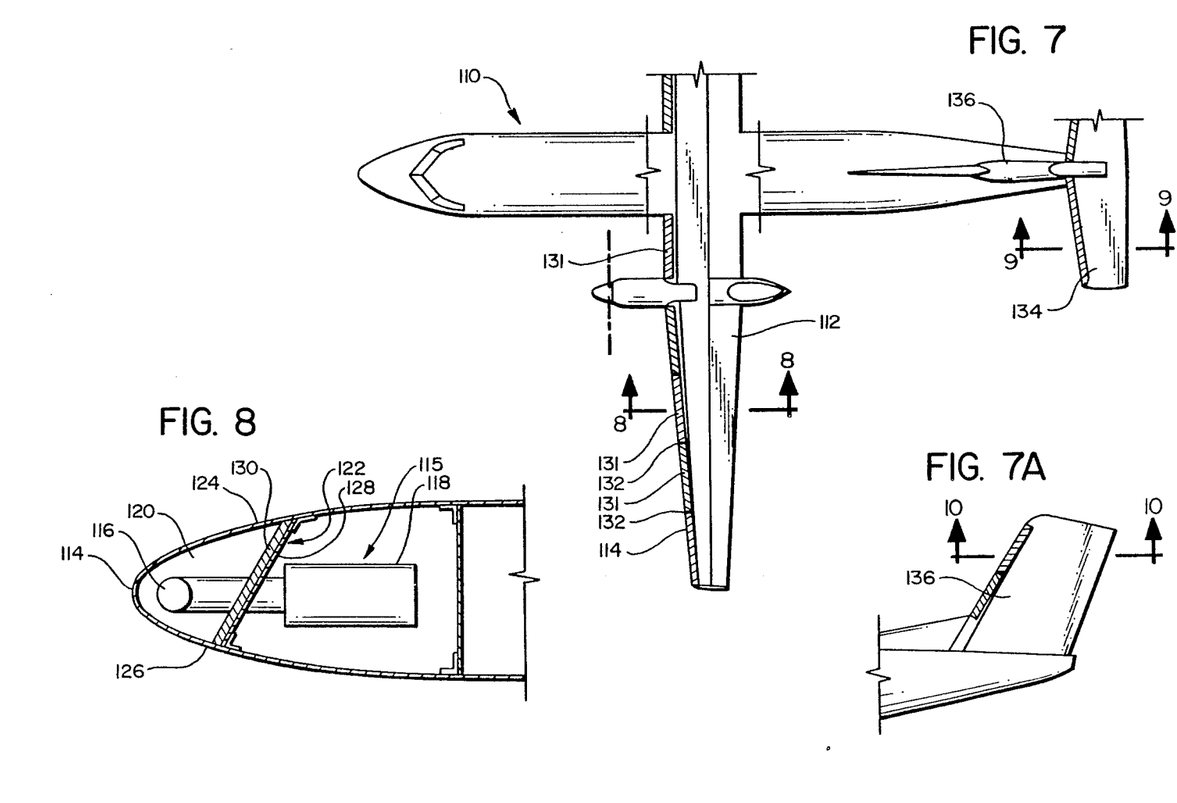
FIG. 7 is a top plan view of an airplane with fixed leading edges incorporating the present invention.
FIG. 7A is a side elevational view of the tail section of the plane of FIG. 7.
FIG. 8 is a sectional view taken along line 8—8 of FIG. 7 and illustrating the present invention incorporated in the leading edge of the wing.

As illustrated in FIG. 8, there is an anti-icing module 115 comprising a spray tube 116 and an air circulating and heating apparatus 118. This apparatus 118 includes a fan unit, a heater and pressure relief valves similar to those shown at 32, 34, 36 and 38, respectively with reference to the first embodiment (see FIG. 3).

The leading edge 114 defines a chamber 120 extending along the length of the leading edge 114, and the rear portion of this chamber is defined by a flow baffle 122 extending between an upper forward skin portion 124 and a lower forward skin portion 126 of the leading edge section 114. This baffle 122 comprises a rear structural plate 128 and a forward layer of insulation 130.

It will be noted that this baffle 122 is slanted in an upward and rearward direction so that a greater area of the upper skin 124 is heated. The reason for this is that the upper surface of the wing needs more anti-icing than the lower, and this determines the shape and slope of the baffle 122. It will be noted, with reference to FIG. 7, that the leading edge 114 is subdivided along its length into more or less equal size zones 131 (this simply being accomplished by separation plates indicated at 132) to allow use of a standardized anti-icing module in each of the sections or zones 131. As in the first embodiment, the anti-icing system can be used as an anti-icing device and thus operate continuously, or as a deicing device where it would operate in a cyclic manner. For example, two of the five zones on one side of the wing could be de-iced at one time, two others at a later time, etc.

Figure 9:
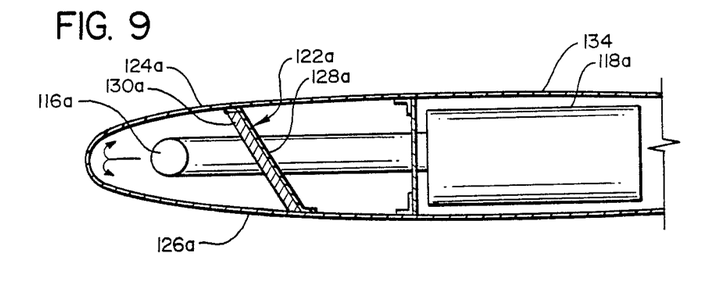
FIG. 9 is a sectional view taken along line 9—9 of FIG. 7, showing the present invention incorporated in the leading edge of the horizontal stabilizer of the tail section.

FIG. 9 illustrates the anti-icing system incorporated in the leading edge of the horizontal stabilizer 134 of the airplane of FIG. 7. The anti-icing apparatus in FIG. 9 is substantially the same as that shown in FIG. 8, and components which are similar to corresponding components in FIG. 8 will be given like numerical designations with an "a" suffix distinguishing those components of FIG. 9. There is a baffle 122a, having the structural plate 128a and the insulation layer 130a. However, this baffle 128a is slanted in an upward and forward direction, the reason being that with the horizontal stabilizer the lower surface is more critical relative to anti-icing or deicing. The arrangement of the baffle 122a directs more of the anti-icing energy to the lower surface 126a.

Figure 10:
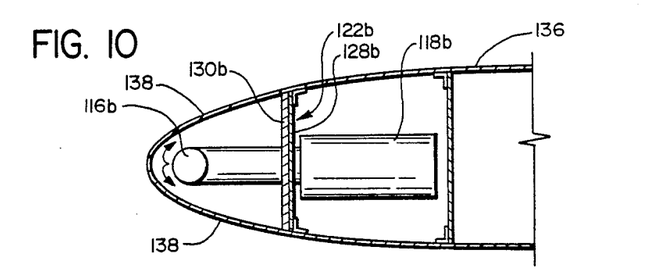
FIG. 10 is a sectional view taken along line 10—10 of FIG. 7A, showing the present invention incorporated in the leading edge of a vertical fin of the tail section.

FIG. 10 shows substantially the same anti-icing apparatus as in FIGS. 8 and 9, with this being applied to the vertical fin 136 of the airplane of FIG. 7. The components in FIG. 10 which are similar to components of FIGS. 7 through 9 will be given like numerical designations with a "b" suffix distinguishing those of FIG. 10. It will be noted that the baffle 122b is aligned transversely with no slant. The reason for this is that the two side surfaces 138 of the leading edge portion of the vertical fin 136 are equally critical relative to deicing and anti-icing.

Figure 11:
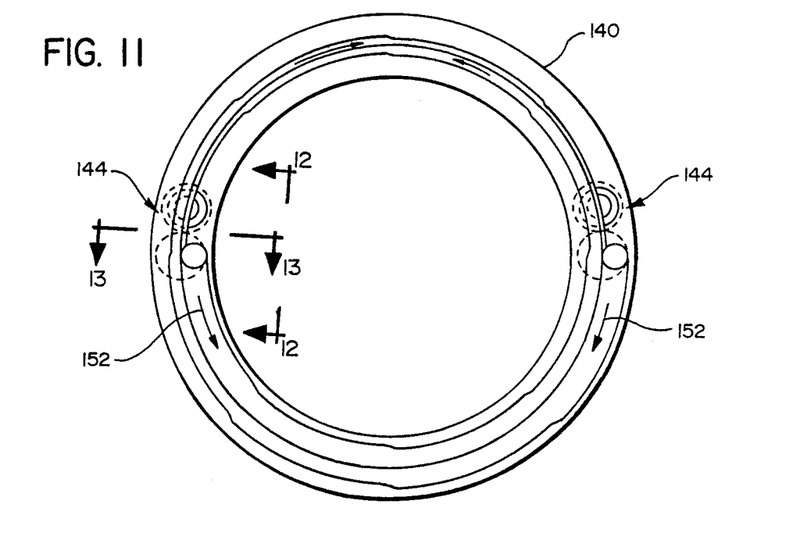
FIG. 11 is a front elevational view of an air inlet of a jet engine incorporating a further embodiment of the present invention, with the skin of the leading edge of the engine inlet being removed for purposes of illustration.
Figure 12:
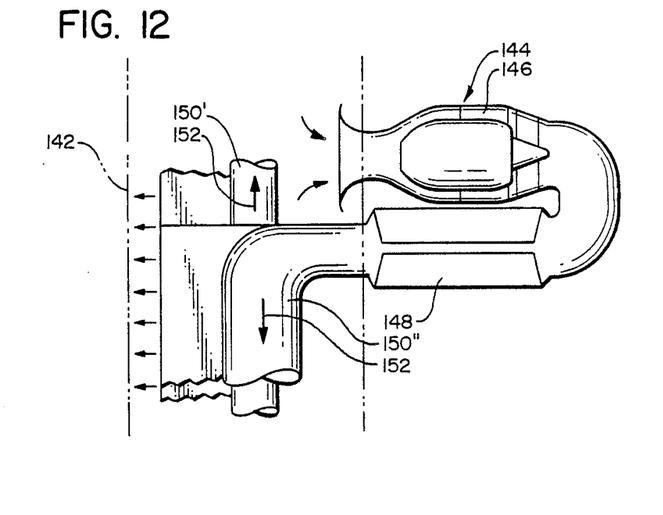
FIG. 12—12 is a view taken at the location indicated at line 12—12 of FIG. 11, with adjacent skin portions being removed for purposes of illustration.
Figure 13:
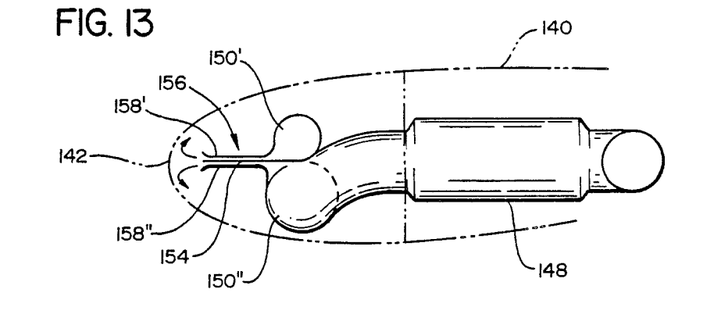
FIG. 13 is a sectional view taken along line 13—13 of FIG. 11.

A fifth embodiment of the present invention is illustrated in FIGS. 11 through 13, and this shows a redundant anti-icing system applied to the leading edge of a jet engine inlet 140. The inlet for the jet engine is shown in a front elevational view in FIG. 11, and the forward skin portion 142 (see FIGS. 12 and 13) is removed in FIG. 11 for purposes of illustration. There are two air circulating and heating devices 144 positioned at diametrically opposed locations on opposite sides of the inlet 140. Each device 144 comprises a motor compressor section 146 and a heating section 148 (see FIG. 12), and these are (or may be) substantially similar to the motor compressor sections and heating sections shown in the prior embodiments. There are two distribution tubes 150, each of which extends circumferentially around substantially the entire inlet, with the cross-sectional area of each tube 150 diminishing in a downstream direction. As shown herein, the directions of flow in the two tubes 150 are opposite to one another, and this is illustrated by the arrows 152 in FIG. 11 and also FIG. 12.

In FIG. 13, there is illustrated one arrangement of the two tubes 150. There is an outside tube 150′ and an inside tube 150″, and these each have a generally circular configuration, but joined to one another at a planar joining plate 154. This plate 154 is shown as a single plate, but could be made as two plates connected together or otherwise mounted in the inlet. The two tubes 150′ and 150″ direct the heated air therein through a discharge nozzle 156 having upper and lower passageways 158′ and 158″ respectively. The plate 154 divides the flow from the upper and lower tubes 150′ and 150″.

In operation, the two anti-icing units 144 are normally operated simultaneously at a reduced rating. However, upon failure of one unit 144, the remaining unit 144 would operate at an increased rating, which may be half again greater than its usual rating. The increased level of output of one unit 144 could be accomplished through a modest increase in pumping power (i.e., higher motor rpm's, higher pressure ratio, and higher spray tube jet velocity) and a moderate increase in the output of the duct heater (higher air supply temperature).

It is to be understood that various modifications could be made to the present invention without departing from the basic teachings thereof. Also, in the claims, it is to be understood that the term "deicing" is to be interpreted broadly enough to include anti-icing.

What is claimed is:

1. A deicing system for an aircraft structure which has a surface member having an exposed surface area upon which ice tends to collect, and which defines an enclosed chamber adjacent thereto, said system comprising:
    a. a hot air distribution tube means having an inlet portion, said tube means being positioned in said chamber and having outlets to discharge hot air into said chamber so as to be in heat exchange relationship with said surface member,
    b. a fan means having an inlet to receive air from said chamber and to move said air to the inlet portion of the tube means,
    c. an electric heater arranged to heat the air which travels through the tube means and is discharged in heat exchange relationship with the surface member,
    d. pressure relief valve means communicating between said chamber and an ambient air location, said valve means being arranged to discharge air from the chamber when pressure in the chamber exceeds ambient pressure by a predetermined level, and to admit ambient air into said chamber when pressure in the chamber is below ambient pressure by a predetermined level,
    e. power supply and control means adapted to selectively supply power to, and cause operation of said fan means and said heater to cause heated air to be directed through said distribution tube means and in heat exchange relationship with the surface member.

2. The system as recited in claim 1, wherein said aircraft structure comprises a leading edge structure, and said system comprises a modular system which can be inserted in, and to remove from, said leading edge structure.

3. The system as recited in claim 2, wherein said leading edge structure is a fixed leading edge structure.

4. The system as recited in claim 3, wherein said surface member comprises a skin portion of said leading edge structure, and said chamber comprises an elongate duct having a lengthwise axis along said leading edge structure, said elongate duct serving as a return passageway to return air discharged from the tube means back to the fan means.

5. The system as recited in claim 1, wherein said aircraft structure comprises a leading edge structure, and said chamber comprises an elongate duct having a lengthwise axis along said leading edge structure, said elongate duct serving as a return passageway to return air discharged from the tube means back to the fan means.

6. The system as recited in claim 1, wherein said fan means is located in an upstream direction, relative to flow of air in the system, from the heater, so that air from the fan means passes through the heater and then to the inlet of the tube means.

7. The system as recited in claim 1, wherein said valve means comprises an outlet valve and an inlet valve positioned to admit air into the inlet of the fan means, the inlet of the fan means being provided with a venturi entrance portion, with ambient air passing through the inlet valve being drawn into the venturi entrance portion to pass through the fan means.

8. The system as recited in claim 1, wherein:
    a. said aircraft structure comprises a leading edge structure, and said system comprises a modular system which can be inserted in, and to remove from, said leading edge structure,
    b. said leading edge structure is a fixed leading edge structure,
    c. said surface member comprises a skin portion of said leading edge structure, and said chamber comprises an elongate duct having a lengthwise axis along said leading edge structure, said elongate duct serving as a return passageway to return air discharged from the tube means back to the fan means,
    d. said fan means is located in an upstream direction, relative to flow of air in the system, from the heater, so that air from the fan means passes through the heater and then to the inlet of the tube means,
    e. said valve means comprises an inlet valve positioned to admit air into the inlet of the fan means, the inlet of the fan means being provided with a venturi entrance portion, with ambient air passing through the inlet valve being drawn into the venturi entrance portion to pass through the fan means.

9. The system as recited in claim 1, wherein there is:
    a. a second hot air distribution tube means having an inlet portion, said tube means being positioned in said chamber and having outlets to discharge hot air into said chamber so as to be in heat exchange relationship with said surface member,
    b. a second fan means having an inlet to receive air from said chamber and to move said air to the inlet portion of the second tube means,
    c. a second electric heater arranged to heat the air which travels through the second tube means and is discharged in heat exchange relationship with the surface member.

10. The system as recited in claim 9, wherein said chamber has a lengthwise axis, and said first and second tube means both extend along said lengthwise axis so that both of the first and second tube means discharge hot air into said chamber at locations along said lengthwise axis, in a manner that if one of said tube means is not discharging air, the other of said tube means is able to deliver hot air at said locations.

11. The system as recited in claim 10, wherein said first and second tube means are arranged so that airflow in said first tube means is opposite to airflow in said second tube means.

12. The system as recited in claim 11, wherein said aircraft structure is a leading edge of an engine inlet, and said first and second tube means each extend circumferentially around said engine inlet.

13. The system as recited in claim 10, wherein said aircraft structure is a leading edge of an engine inlet, and said first and second tube means each extend circumferentially around said engine inlet.

14. The system as recited in claim 1, wherein said aircraft structure is a leading edge, having a front skin portion, a first side skin portion, and a second side skin portion, said system further comprising a rear wall means defining a rear part of said chamber and extending between said first and second side skin portions, said rear wall means being positioned so as to expose a greater portion of said first skin portion to hot air in said chamber, and to expose a lesser portion of said second skin portion to hot air in said chamber, whereby greater deicing is accomplished at said first skin portion.

15. The system as recited in claim 14, wherein said leading edge structure is a leading edge portion of a wing, and said first skin portion is at an upper surface of said wing leading edge.

16. The system as recited in claim 14, wherein said leading edge structure is a horizontal stabilizer leading edge structure and said first skin portion is at a lower surface of said stabilizer leading edge structure.

17. A deicing system for an aircraft having a plurality of surface members, each of which has an exposed surface area upon which ice tends to collect, with each surface member defining a related enclosed chamber adjacent thereto, said system comprising:
 a. a plurality of deicing units, each of said units comprising:
  1. a hot air distribution tube means having an inlet portion, said tube means being positioned in the chamber of a related surface member and having outlets to discharge hot air into said chamber so as to be in heat exchange relationship with its related surface member,
  2. a fan means having an inlet to receive air from said related chamber and to move said air to the inlet portion of the tube means,
  3. an electric heater arranged to heat the air which travels through the tube means and is discharged in heat exchange relationship with the surface member,
  4. pressure relief valve means communicating between said chamber and an ambient air location, said valve means being arranged to discharge air from the chamber when pressure in the chamber exceeds ambient pressure by a predetermined level, and to admit ambient air into said chamber when pressure in the chamber is below ambient pressure by a predetermined level,
 b. control means adapted to selectively supply power to, and cause operation of, said fan means and said heater of each of said deicing units to cause heated air to be directed selectively through the distribution tube means of selected deicing units whereby said deicing units can be operated sequentially so as to minimize peak power requirements for the system.

18. The system as recited in claim 17, wherein at least some of said surface members are leading edge members, and each deicing unit for the leading edge members comprises a modular unit which can be inserted in, and to remove from, said leading edge members.

19. The system as recited in claim 18, wherein at least some of said surface members are fixed leading edge structures.

20. The system as recited in claim 19, wherein each of said surface members comprises a skin portion of said leading edge structure, and said chamber comprises an elongate duct having a lengthwise axis along said leading edge structure, said elongate duct serving as a return passageway to return air discharged from the tube means back to the fan means.

21. The system as recited in claim 17, wherein at least some of said surface members comprise a leading edge structure, and said chamber comprises an elongate duct having a lengthwise axis along said leading edge structure, said elongate duct serving as a return passageway to return air discharged from the tube means back to the fan means.

22. The system as recited in claim 17, wherein each of said fan means is located in an upstream direction, relative to flow of air in the system, from the heater, so that air from the fan means passes through the heater and then to the inlet of the tube means.

23. The system as recited in claim 17, wherein said valve means of each deicing unit comprises an outlet valve and an inlet valve positioned to admit air into the inlet of the fan means, the inlet of the fan means being provided with a venturi entrance portion, with ambient air passing through the inlet valve being drawn into the venturi entrance portion to pass through the fan means.

24. The system as recited in claim 17, wherein:
 a. at least some of said surface members are leading edge members, and each deicing unit comprises a modular unit which can be inserted in, and removed from, said leading edge structure,
 b. at least some of said surface members are fixed leading edge structures,
 c. each of said surface members comprises a skin portion of said leading edge structure, and said chamber comprises an elongate duct having a lengthwise axis along said leading edge structure, said elongate duct serving as a return passageway to return air discharged from the tube means back to the fan means,
 d. each of said fan means is located in an upstream direction, relative to flow of air in the system, from the heater, so that air from the fan means passes through the heater and then to the inlet of the tube means,
 e. said valve means of each deicing unit comprises an outlet valve and an inlet valve positioned to admit air into the inlet of the fan means, the inlet of the fan means being provided with a venturi entrance portion, with ambient air passing through the inlet valve being drawn into the venturi entrance portion to pass through the fan means.

25. A deicing system for an aircraft structure which has a surface member having an exposed surface area upon which ice tends to collect, and which defines an enclosed chamber adjacent thereto, said system comprising:

a. a hot air distribution tube means having n inlet portion, said tube means being positioned to said chamber and having outlets to discharge hot air into said chamber so as to be in heat exchange relationship with said surface member, b. a compressor means having an inlet to receive air from said chamber and to compress said air to cause a rise in temperature of said air sufficient to accomplish deicing, and then move said air to the inlet portion of the tube means, with energy imparted to said air by compression thereof contributing substantially to increase of temperature of said air to a level sufficiently high to accomplish deicing, c. power supply and control means adapted to selectively supply power to, and cause operation of, said compressor means to cause heated air to be directed through said distribution tube means and in heat exchange relationship with the surface member, d. said aircraft structure comprising a leading edge structure, and said system comprising a modular system which can be inserted in, and removed from, said leading edge structure.

26. The system as recited in claim 25, wherein said leading edge structure is a fixed leading edge structure.

27. The system as recited in claim 26, wherein said surface member comprises a skin portion of said leading edge structure, and said chamber comprises an elongate duct having a lengthwise axis along said leading edge structure, said elongate duct serving as a return passageway to return air discharged from the tube means back to the fan means.

28. The system as recited in claim 27, wherein said compressor means comprises an electric motor positioned to be in heat exchange relationship with air passing into said tube means, whereby heat generated by said motor is utilized for deicing.

29. A deicing system for an aircraft structure which has a surface member having an exposed surface area upon which ice tends to collect, and which defines an enclosed chamber adjacent thereto, said system comprising:

a. a hot air distribution tube means having an inlet portion, said tube means being positioned in said chamber and having outlets to discharge hot air into said chamber so as to be in heat exchange relationship with said surface member, b. a compressor means having an inlet to receive air from said chamber and to compress said air to cause a rise in temperature of said air sufficient to accomplish deicing, and then move said air to the inlet portion of the tube means, with energy imparted to said air by compression thereof contributing substantially to increase of temperature of said air, to a level sufficiently high to accomplish deicing, c. power supply and control means comprising an electric motor adapted to selectively supply power to, and cause operation of, said compressor means to cause heated air to be directed through said distribution tube means and in heat exchange relationship with the surface member, d. said aircraft structure comprising a leading edge structure.

30. The system as recited in claim 29, wherein said leading edge structure is a fixed leading edge structure.

31. The system as recited in claim 30, wherein said surface member comprises a skin portion of said leading edge structure, and said chamber comprises an elongate duct having a lengthwise axis along said leading edge structure, said elongate duct serving as a return passageway to return air discharged from the tube means back to the fan means.

32. The system as recited in claim 31, wherein said electric motor is positioned to be in heat exchange relationship with air passing into said tube means, whereby heat generated by said motor is utilized for deicing.

* * * * *